United States Patent [19]

Byford

[11] Patent Number: 4,778,129
[45] Date of Patent: Oct. 18, 1988

[54] CONTROL SURFACE DRIVE FOR FOLDING WING AIRCRAFT

[75] Inventor: Frank Byford, Washington, Wash.

[73] Assignee: The Boeing Company, Seattle, Wash.

[21] Appl. No.: 24,939

[22] Filed: Mar. 12, 1987

[51] Int. Cl.$^4$ .............................................. B64C 3/56
[52] U.S. Cl. .................... 244/49; 244/75 R; 74/469
[58] Field of Search ............ 244/46, 49, 75 R; 74/469; 464/117, 162

[56] References Cited

U.S. PATENT DOCUMENTS

| 379,030 | 3/1888 | Robes ................................ 464/117 |
| 2,044,357 | 6/1936 | Kerr . |
| 2,406,073 | 8/1946 | Griswold et al. ....................... 244/49 |
| 2,534,764 | 12/1950 | Focht . |
| 2,538,602 | 1/1951 | Taylor et al. . |
| 2,712,421 | 7/1955 | Naumann . |
| 3,423,958 | 1/1969 | Koelling ............................ 464/117 |
| 3,427,824 | 2/1969 | Mayrath ............................. 464/179 |
| 4,121,436 | 10/1978 | Garrison ............................ 464/179 |
| 4,286,761 | 9/1981 | Musgrove ........................ 244/75 R |

FOREIGN PATENT DOCUMENTS

| 235372 | 6/1925 | United Kingdom ................ 464/117 |
| 475433 | 11/1937 | United Kingdom . |
| 1591373 | 6/1981 | United Kingdom ................. 244/49 |

Primary Examiner—Galen Barefoot
Assistant Examiner—L. M. Fiorito
Attorney, Agent, or Firm—Seed and Berry

[57] ABSTRACT

The control surface drive has three shafts. The shafts are rotatably coupled by four universal joints. Mechanisms are provided to guide the shafts as outboard wing sections are moved between folded and unfolded positions. Rotary coupling between the inboard and outboard control surface drives is maintained during folding motion of the outboard wing sections.

20 Claims, 5 Drawing Sheets

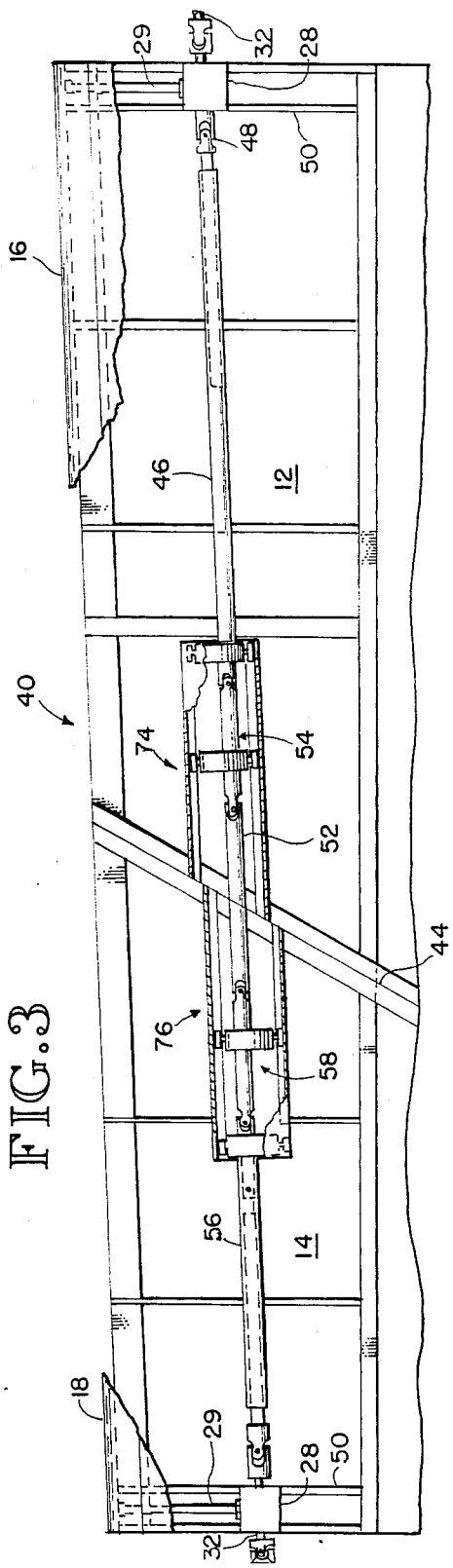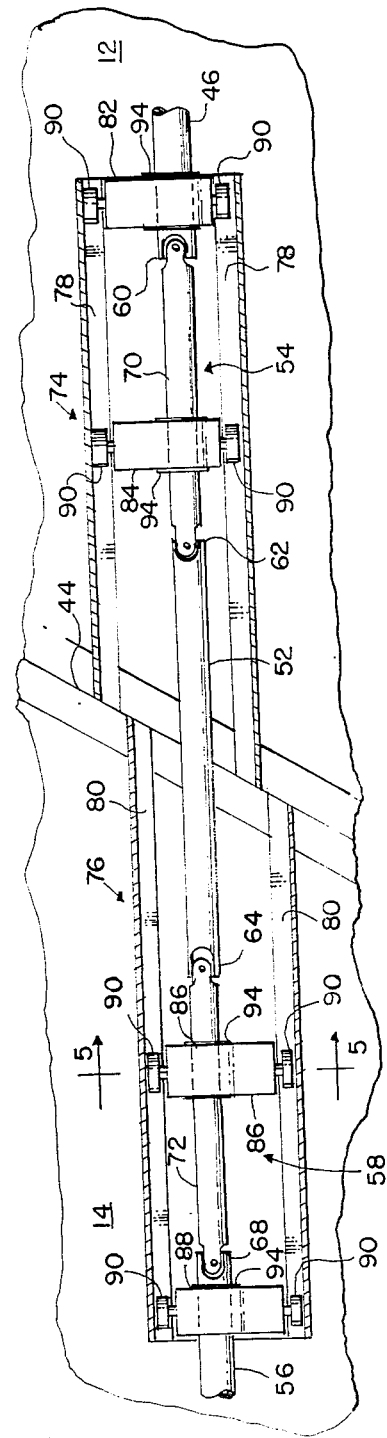

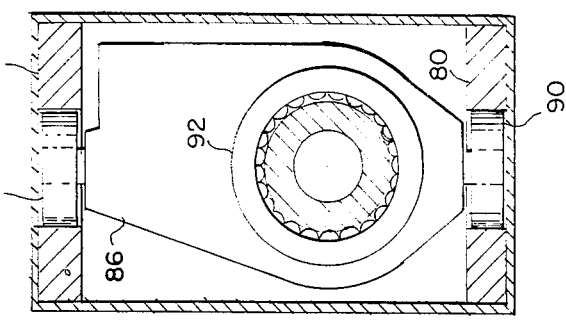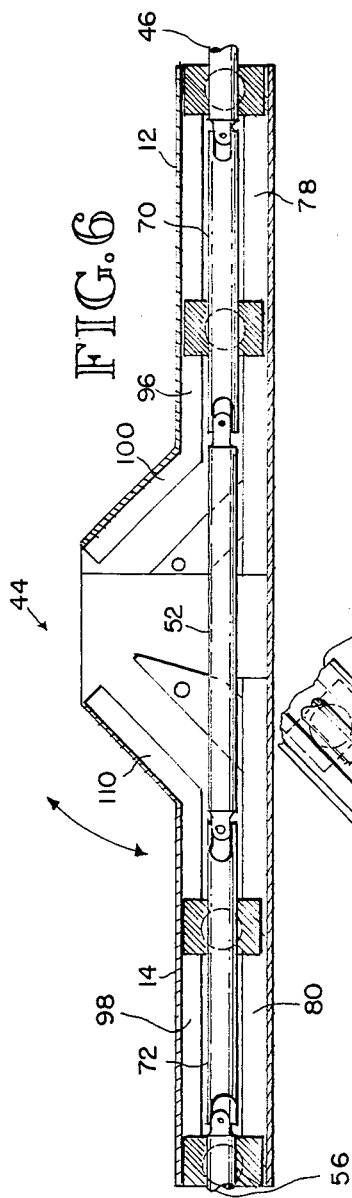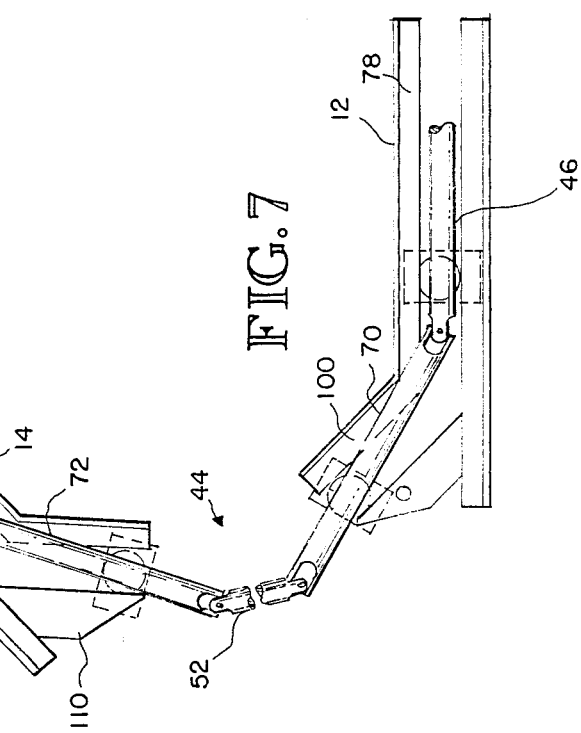

CONTROL SURFACE DRIVE FOR FOLDING WING AIRCRAFT

STATEMENT OF GOVERNMENT INTEREST

This invention was made with government support under Contract No. N00019-85-C-0311 awarded by the United States Navy. The government has certain rights in this invention.

TECHNICAL FIELD

This invention relates to drive mechanisms for control surfaces on folding wing aircraft. More specifically, the invention relates to apparatus for transmitting torque across the wing fold axis of folding wing aircraft at the wing leading and trailing edges for actuation of high lift control surfaces.

BACKGROUND ART

Folding wing aircraft have found particular utility for service aboard naval vessels, such as aircraft carriers. Such aircraft typically have inboard wing sections which are pivotally connected to outboard wing sections. The outboard wing sections are thus foldable with respect to the inboard wing sections, reducing the surface area required to stow the aircraft aboard a vessel. The wing fold axis is typically aligned with the fuselage of the aircraft and transverse to the axis of the wing.

Airflow control surfaces are generally present on the foldable wings. For example, the wings have flight control surfaces, such as ailerons, and high lift control surfaces, such as leading edge slats and trailing edge flaps may be present. These control surfaces traverse the wing fold axis so that the control surfaces are divided into inboard and outboard control surface sections. Therefore, mechanisms are provided to drive these surfaces across the wing fold axis.

Among modern folding wing aircraft, leading edge slats and trailing edge flaps are typically connected to the wing by tracks which guide the slats and flaps along controlled paths. The slats and flaps (hereinafter referred to as control surfaces) are driven by ball screw actuators or other devices, such as rotary geared power hinges, located at various points along the wing. The ball screw actuators require a rotary input to move the control surfaces. Thus, torque tubes are provided in the interior of the wing to transmit torque from a fuselage-mounted gear box through the inboard wing section and across the wing fold axis to the outboard wing section.

The torque tubes are typically transverse to and displaced from the wing fold axis. Universal joints are often provided wherever a torque tube intersects a wing rib so that flexure of the wing does not bind the drive system. At the wing fold axis, a particular geometric problem is encountered because the drive axis, defined by the torque tubes, is both displaced from, and often an angle of more than 90° relative to, the wing fold axis. Furthermore, the angle with which the outboard wing section is pivotable with respect to the inboard wing section is often more than 90°. Thus, the outboard torque tube becomes displaced from the inboard torque tube through a compound motion.

Mechanisms are presently employed to transmit torque across the wing fold axis from the inboard wing section to the outboard section. One mechanism utilizes a wing fold gearbox having a dog clutch. The dog clutch has a plurality of interlocking fingers which engage one another when the wing is unfolded (i.e., wings spread). When the wing is folded, the fingers disengage one another. Thus, the inboard torque tubes are disengaged from the outboard torque tubes. While this system permits torque to be transmitted across the wing fold axis when the wings are spread, the control surfaces cannot be operated when the wings are folded. This is particularly disadvantageous when maintenance is required on the control surface systems. Furthermore, it is possible for a mechanic to manually engage the fingers of the dog clutch on the outboard wing section when the wings are folded with a wrench or other implement, possibly placing the inboard and outboard control surfaces out of synchronization when the wings are unfolded.

Therefore, a need exists for a system which can transmit torque across a wing fold axis on folding wing aircraft which is highly reliable, light in weight and which can transmit torque across the wing fold axis while the wings are folded and while the wings are being folded.

DISCLOSURE OF THE INVENTION

It is an object of the present invention to provide an apparatus which can transmit torque across the wing fold axis of a folding wing aircraft while the wings are folded and while the wings are being folded.

It is also an object of the present invention to achieve the above object while minimizing the weight of the mechanism.

It is yet another object of the present invention to achieve the above two objects with a mechanism which is highly reliable.

The invention achieves the above objects, and other objects and advantages which will become apparent from the description which follows, by providing an articulated rotary coupling having a plurality of shafts innerconnected by rotary connections. At least one of the shafts has a variable length. The shafts are guided during the wing fold/unfold operation so as to smoothly transmit torque from the inboard wing section to the outboard wing section.

A first preferred embodiment is provided for coupling the inboard leading edge slat with the outboard leading edge slat. The slat drive embodiment utilizes two telescoping halves which are rotatably connected to a fixed length intermediate shaft. Carriages guide and telescope the fixed length shafts through a compound articulated movement to maintain the position of the intermediate shaft external to the wing fold axis. In this way, the coupling does not interfere with the operation of the slats which overlie the position of the coupling.

A second preferred flap drive embodiment is provided for coupling the inboard trailing edge flap. The flap drive utilizes two fixed shafts rotatably connected to an intermediate telescoping shaft. The shafts are guided through a compound articulated movement during the wing folding/unfolding operation so that torque is smoothly transmitted from the inboard wing section to the outboard wing section. The intermediate telescoping shaft intersects the wing fold axis (the trailing edge flap is completely external to the wing). Therefore, apertures are provided in the wing to accommodate the telescope shaft. A pivotally connected cover is attached to the wing to conceal the aperture when the wing is unfolded.

BRIEF DESCRIPTION OF THE DRAWINGS

FIG. 3 is an enlarged, sectional top plan view of an inboard and outboard wing section utilizing the slat drive embodiment of the present invention.

FIG. 4 is an enlarged view of the slat drive embodiment shown in FIG. 3.

FIG. 5 is a sectional view, taken along line 5—5 of FIG. 4.

FIG. 6 is a side elevational view of the slat drive embodiment of the present invention in an unfolded position.

FIG. 7 is a side elevational view of the slat drive embodiment of the present invention shown in the wing folded position.

BEST MODE FOR CARRYING OUT THE INVENTION

Figure 1:
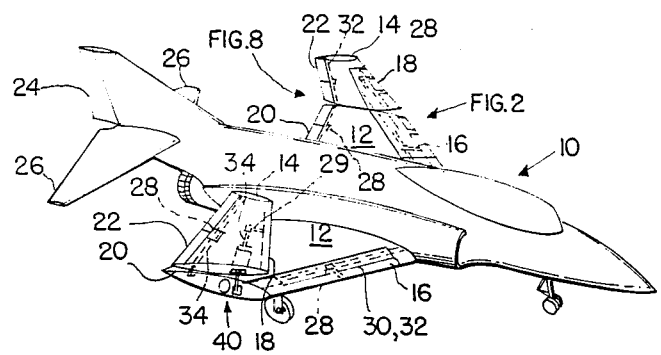
FIG. 1 is an isometric view of a folding wing aircraft utilizing the slat drive and flap drive articulated rotary couplings of the present invention.
Figure 2:
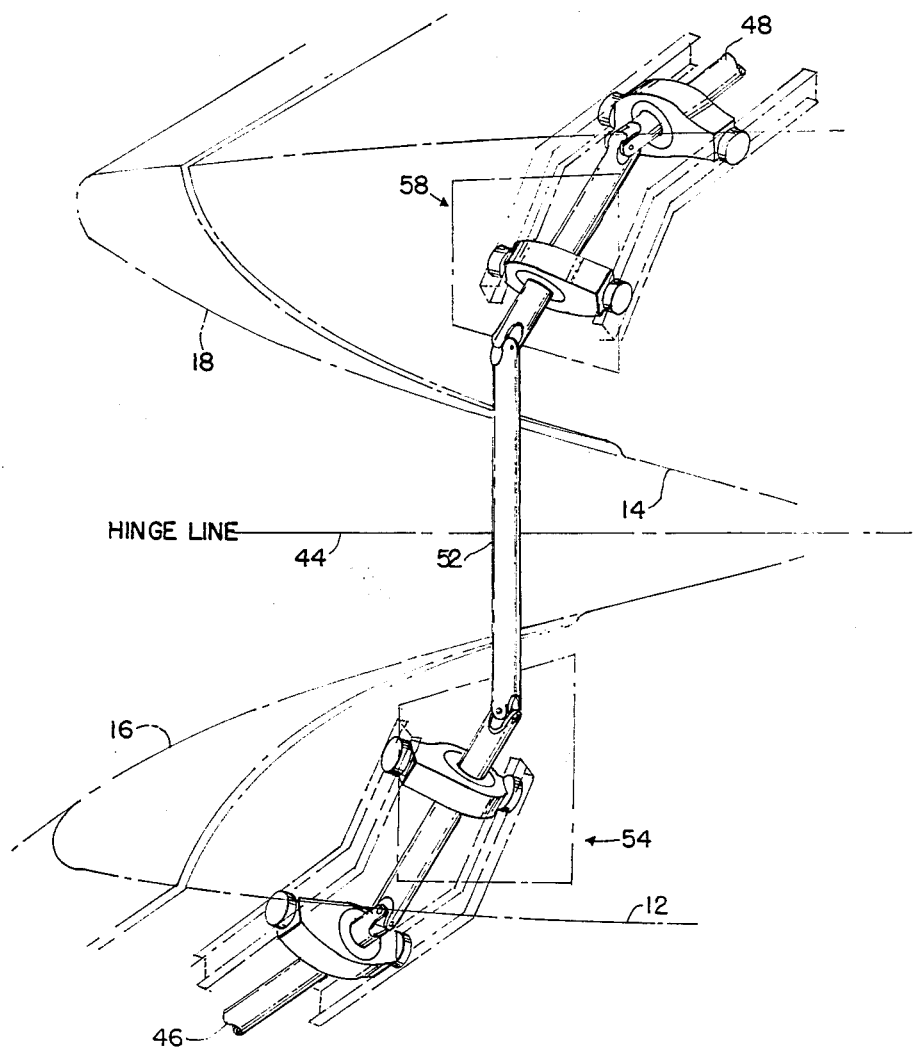
FIG. 2 is a schematic, isometric representation of the slat drive embodiment of the present invention showing an outboard wing section in the folded position.

A conventional folding wing aircraft, generally indicated at reference numeral 10, is shown in FIG. 1. The aircraft has inboard wing sections 12 pivotally connected to outboard wing sections 14. One outboard wing section is shown in a fully folded position while the other outboard wing section is shown in a partially folded position.

Each wing of the aircraft 10 has an inboard leading edge slat 16 which is operated synchronously with an outboard leading edge slat 18. Each wing also has an inboard trailing edge flap 20 which is operated synchronously with an outboard trailing edge flap 22. The aircraft also has flight control surfaces such as ailerons or flaperons (not shown) and other flight control surfaces such as rudder 24 and elevators or tail planes 26 which are not affected by folding or unfolding of the inboard wing sections with respect to the outboard wing sections.

The slats 16, 18 and flaps 20, 22 are connected to helical ball screws which are driven by ball screw actuators 28. The ball screw actuators 28 are driven by elongated torque tubes 30 which have inboard sections 32 and outboard sections 34 defining a torque tube drive system. The inboard torque tubes are driven by a fuselage-mounted gear box (not shown) which is controlled by the pilot.

A first embodiment of the invention, shown in FIGS. 2 through 7 and generally indicated at reference numeral 40, is an articulated slat drive rotary coupling for transmitting torque from the inboard torque tubes 32 to the outboard torque tubes 34 across the wing fold axis identified in the figures at reference numeral 44.

As best seen in FIG. 3, the slat drive rotary coupling has a telescoping input shaft 46 rotatably connected to the inboard torque tube 32 through a ball screw actuator 28 and a universal joint 48. Interconnected portions of the torque tubes are rotatably supported at wing ribs 50 with universal joints so that flexure of the wing does not bind the torque tube drive system.

The telescoping input shaft 46 is also connected to a fixed length intermediate shaft 52 by an inboard rotary connection, generally indicated at reference numeral 54. The intermediate shaft 52 is also connected for rotation with a telescoping output shaft 56 through an outboard rotary connection, generally indicated at reference numeral 58 which is similar to the inboard rotary connection 54. The inboard and outboard rotary connections 54, 58 permit smooth transfer of torque from the telescoping input shaft 46 throughout the entire pivoting motion of the outboard wing section 14 with respect to the inboard section 12.

It is particularly important that the slat drive rotary coupling 40 smoothly transmit torque throughout the pivoting motion of the outboard wing section. The torque tubes and the input, intermediate and output shafts define a drive system axis. The wing fold axis 44 is displaced from the drive system axis by 117°. The outboard wing section 14 in the folded position is pivoted 147° relative to its position in the wing unfolded position. Thus, the slat drive rotary coupling must be capable of transmitting torque from an input shaft to an output shaft at angles greater than 90° and while undergoing a complex, compound motion. Furthermore, as will be apparent from the description below, it is also desirable to maintain the position of the intermediate shaft 52 external to the wing fold axis 44 throughout the wing folding/unfolding operation.

Therefore, the inboard and outboard rotary connections 54, 58 have each been provided with four universal joints 60, 62, 64, 68 which distribute the angular displacement between the input and output shafts 46, 56 during the wing fold motion. Universal joints 60 and 62 are connected by an inboard stub shaft 70. Universal joints 64 and 68 are rotatably connected by an outboard stub shaft 72. it is known that universal joints can jam if the joints are operated with an angular displacement greater than 45°. Thus, for the parameters described above, it has been found that four universal joints are sufficient to divide the angular displacement of the input shaft 46 with respect to the output shaft 56 into workable components.

In order to prevent rotation of stub shafts 70 and 72 about centrally located axes perpendicular to the axes defined by the input shaft 46 and output shaft 56, respectively, and to guide the intermediate shaft 52, inboard and outboard track and carriage systems, generally indicated at reference numerals 74, 76, are provided. The track and carriage systems are connected to ribs of the respective wing sections. Each system 74, 76 has a pair of tracks 78, 80 which guide four roller carriages 82, 84, 86 and 88. Each carriage is slidably mounted in the tracks 78, 80 by rollers 90.

As best seen in FIG. 5, each of the roller carriages rotatably supports its adjacent shaft through roller bearings 92. Each of the roller carriages is also axially fixed with respect to its adjacent shaft by washers 94 or any other conventional means. The tracks 78, 80 thus guide the carriages which support and guide the input and output shafts 46, 56, stub shafts 70, 72 and intermediate shaft 52 throughout the folding and unfolding motion of the outboard wing section 14.

As shown in FIGS. 4 and 6, the shafting is entirely co-linear when the outboard wing section 14 is unfolded with respect to inboard wing section 12.

When the outboard wing section 14 is folded, as shown in FIG. 7, the intermediate shaft 52 does not intersect the wing fold axis 44. As will be apparent from review of FIG. 2, it is highly desirable to maintain the intermediate shaft 52 external to the wing fold axis 44 throughout the pivoting motion of the outboard wing section 14. Note that the articulated slat drive rotary coupling 40 and the entire torque tube drive system 30 is displaced beneath a curved section of the wing leading edge and beneath a portion of the moving slats 16, 18. Thus, it would be highly undesirable to interrupt this curved surface to provide apertures for the intermediate shaft 52. As will be described below, in other sections of the wing which are relatively flat (such as the area adjacent the trailing edge flaps) and which are not overlain by a movable control surface, other arrangements can be made.

Tracks 78, 80 each have first parts 96, 98 which define a path generally parallel to the plane defined by the respective wing section. Each track also has second parts 100, 110, respectively, which define paths at an angle of approximately 45° with respect to the plane defined by the wing sections. It has been found that the angle formed by these track sections assists the telescoping action of the input shaft 46 and output shaft 56 during the wing fold and unfold operations. If a steeper angle between the track first and second parts is used, shorter telescoping tubes may be used, thus reducing the strain imposed on the universal joints. However, the maximum allowable angle defined by the second track parts with respect to the first track parts is limited by the thickness of the wing section at the leading edge. Conversely, a decrease in the angle formed by the second track part with respect to the first track part requires a longer telescoping action in the input and output shafts and imposes a greater strain on the universal joint. Such a system would fit in a relatively thin wing section. It is believed that an angle in the range of 20° to 60° would work satisfactorily.

Sufficient lateral clearance must be maintained between the intermediate shaft 52 and the tracks 78, 80 during the wing folding operation. It is to be remembered that the intermediate shaft 52 not only pivots upwardly with respect to the inboard wing section 14, but also backwardly toward the tail section of the aircraft after the outboard wing section reaches approximately the 90° position. For this reason, the tracks and carriages appear to be offset in FIGS. 3 and 4.

FIGS. 8 through 11 illustrate an articulated flap drive rotary coupling embodiment, generally indicated at reference numeral 120 of the present invention. The flap drive rotary coupling has fixed length input and output shafts 122, 124, respectively, and a telescoping intermediate shaft 126.

Figure 10:
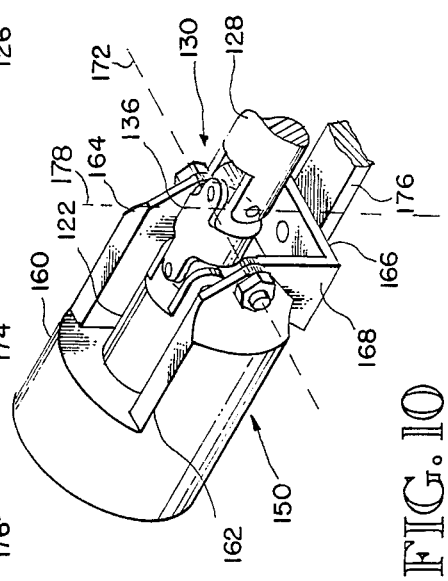
FIG. 10 is an enlarged isometric view of a portion of the flap drive embodiment.
Figure 11:
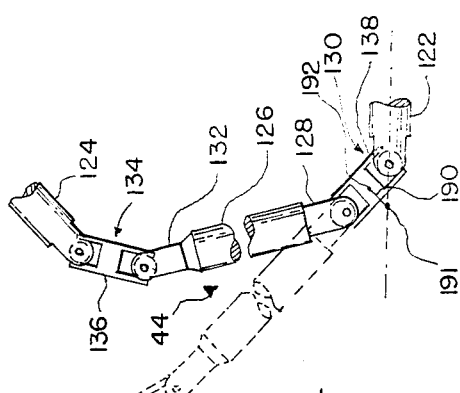
FIG. 11 is a side elevational view illustrating the shaft coupling of the flap drive embodiment in two different positions.

The input shaft 122 is rotatably connected to an inboard end 128 of the intermediate shaft 126 through an inboard rotary connection generally indicated at reference numeral 130 in FIGS. 10 and 11. An outboard end 132 of the intermediate shaft 126 is rotatably connected to the output shaft 124 by an outboard rotary connection generally indicated at reference numeral 134. The inboard and outboard rotary connections each comprise two universal joints similar to universal joints 60, 62, 63 and 64 of the slat drive rotary coupling embodiment 40 shown in FIGS. 2-7. In this slat drive rotary coupling embodiment, inboard and outboard stub shafts 136, 138 are substantially shorter than the inboard and outboard stub shafts 70, 72 of the slat drive rotary coupling embodiment 40. The telescoping intermediate shaft 126 can comprise an interior shaft 140 which is slidably received in a cylindrical cavity 142 defined by an outer sleeve 144. A pin 146 connected to the interior shaft 140 engages in a slot 148 to rotatably couple the inner shaft with the outer sleeve and to limit the axial displacement of the interior shaft with respect to the outer sleeve. Any other suitable means of coupling sections of a telescoping shaft such as a splined inner shaft with a correspondingly splined outer shaft may be substituted.

In order to prevent rotation of the stub shafts 136, 138 about centrally located axes perpendicular to axes defined by the input shaft 122 and output shaft 124, respectively, inboard and outboard non-torque transmitting elbows 150, 152 are provided. The inboard elbow 150 is rotatably connected and axially fixed to the input shaft 122 and rotatably connected to the inboard end 128 of the intermediate shaft 26. The outboard elbow 152 is rotatably connected and axially fixed to the output shaft 124 and rotatably connected to the outboard end of the intermediate shaft 126. Each elbow is pivotable about two intersecting orthogonal axes. The point of intersection between the two axes is within the area defined by the travel of the inboard and outboard rotary connections 130, 134. In this way, the inboard and outboard elbows 150, 152 positively define the positions of the input, intermediate, and output shafts with respect to one another. The structure of the inboard and outboard elbows 150, 152 is essentially identical.

Figure 9:
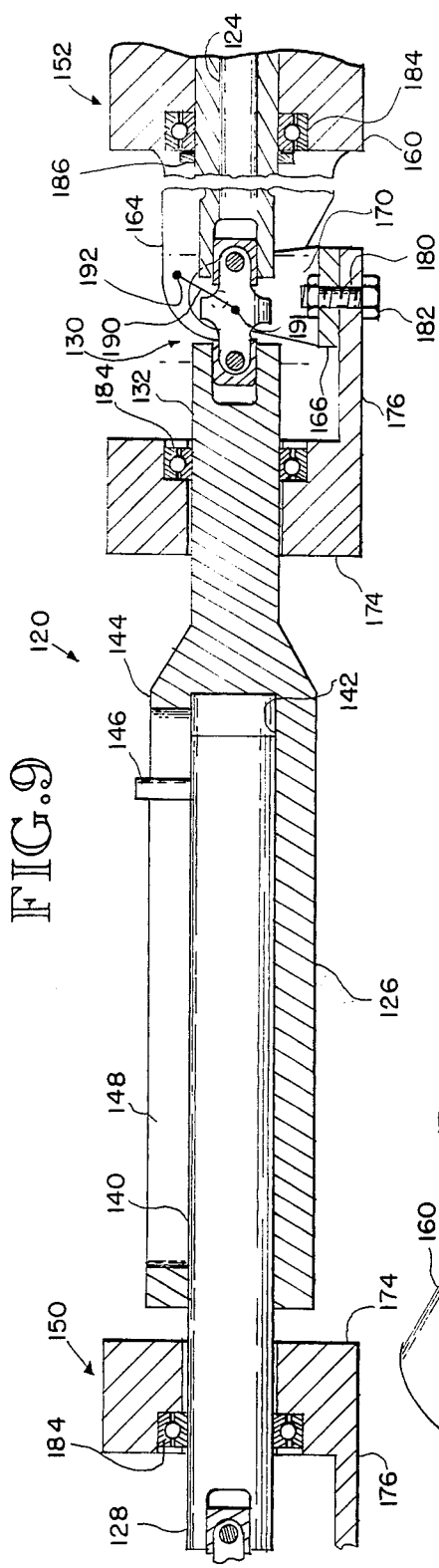
FIG. 9 is a partial, sectional view of the flap drive embodiment shown in FIG. 8.

As shown in FIGS. 9 and 10, each elbow 150, 152 has a first yoke 160 having two arms 162, 164 which extend approximately to the middle of stub shafts 136, 138. The first yokes 160 are fixed to ribs 165 of the wing sections. A second yoke 166 has two arms 168, 170. The arms 168, 170 are pivotally connected to the arms 162, 164 to form a first one 172 of the orthogonal axes described above. The pivotal connection between the arms is entirely conventional. A third yoke 174 is provided with a single arm 176. The single arm 176 is pivotally connected by a pivot connection 182 to the second yoke 166 about a second one 189 of the orthogonal axes. A sleeve 180 can be provided in a bore formed in the second yoke 166 and single arm 176 to provide a bearing for the pivot connection 182.

The first and third yokes 160, 174 are rotatably connected to the input shaft 122, the inboard end of the intermediate shaft 126, the output shaft 124, and the outboard end of the intermediate shaft, respectively, by bearings 84. Washers 186, similar to washers 94, can be used to axially fix the input and output shafts to the first yokes 160.

As best seen in FIG. 11, two degrees of freedom for the inboard and outboard elbows 150, 152 are necessary to accommodate the compound pivoting action of the intermediate shaft 126 with respect to the input shaft 122. The input, intermediate, and output shafts essentially rotate in the plane of the paper in FIG. 11 until the outboard wing section achieves approximately a 90° angle with respect to the inboard wing section (represented by dashed lines in FIG. 11). However, as the upper wing section pivots to a fully folded position of approximately 147°, the intermediate shaft 126 and output shaft 124 rotate slightly out of the plane of the paper in FIG. 11 to the solid line position (i.e., toward the rear of the aircraft). Thus, it is desirable to provide intermediate shaft 126 and output shaft 124 with the ability to rotate about the axis 178 when the shafts move to the solid line position shown in FIG. 11. Pivot connection 182 provides this ability when the second yoke 166 is rotated 90° from the position shown in FIG. 10. In this position, note that the axis of pivot connection 182 is aligned with the axes of the input and output shafts 122, 124.

The elbows 150, 152 also serve to distribute the angular displacement of the input shaft 122 and output shaft 124 equally among the four universal joints. This is desirable to promote linear behavior and to prevent jamming of the joints. To achieve the above, the intersection of orthogonal axes 172, 178 should be located approximately on a reference line segment 190.

Reference line segment 190 is defined by two points 191, 192. Point 191 is located by the center of stub shafts 136, 138 when the shafts are in the wing unfolded positions (i.e., co-linear). Point 191 can also be defined by the intersection of the intermediate shaft axis with the input or output shaft axes when the shafts are in the wing folded position. Point 192 is located at the center of the stub shafts 136, 138 when the shafts are in the wing folded position. Point 192 can also be defined by the intersection of a bisector of the angle defined by the intermediate and input or output shafts and a line passing through the axes of the stub shafts.

Figure 8:
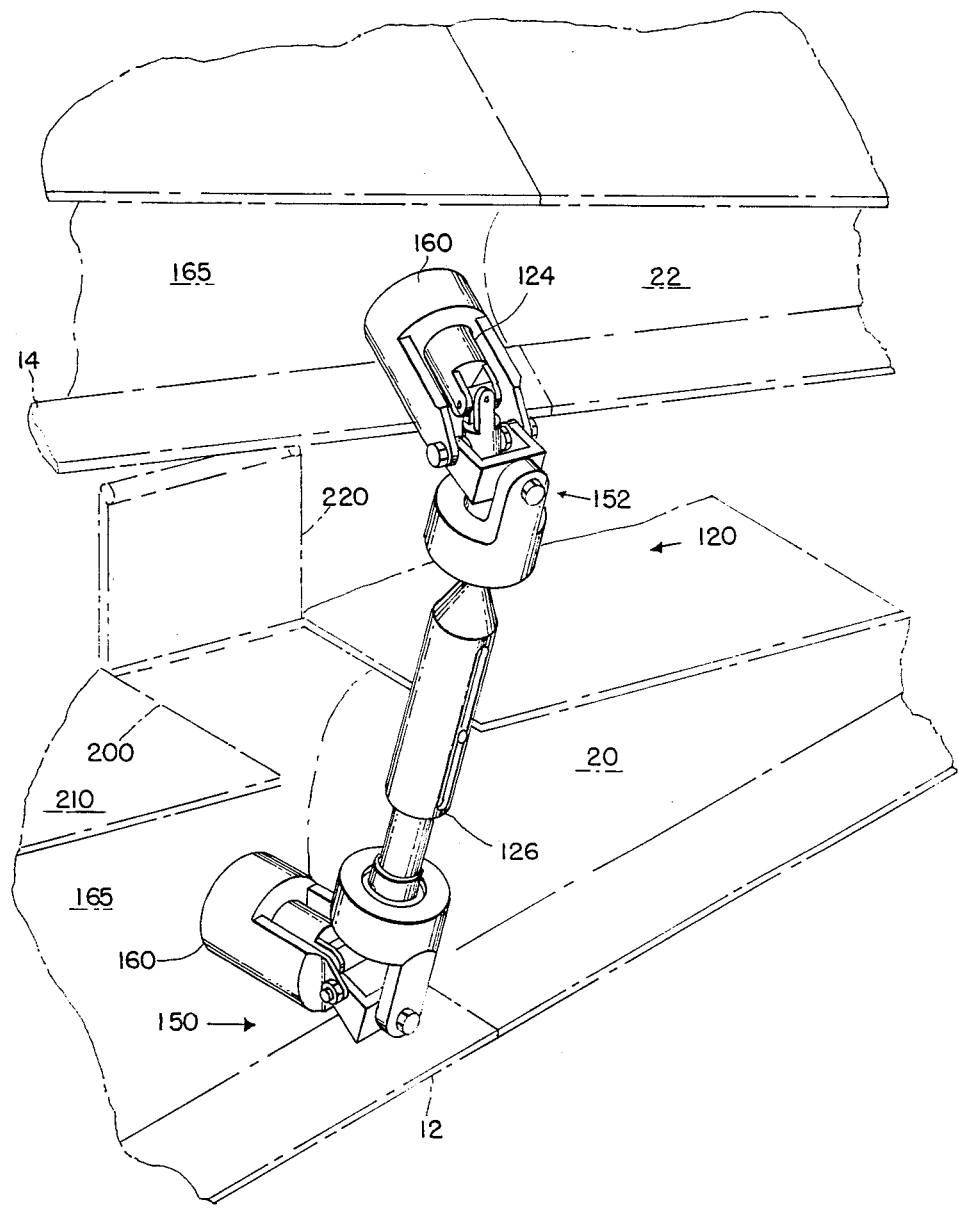
FIG. 8 is an isometric view of the flap drive embodiment of the present invention.

In contrast to the articulated slat drive rotary coupling embodiment 40 of the invention shown in FIGS. 2-7, note that the telescoping intermediate shaft 126 of the articulated flap drive rotary coupling embodiment 120 shown in FIGS. 8-11 passes through the wing fold axis 44. As best shown in FIG. 8, an aperture 200 is provided in the inboard wing section 12 to accommodate the intermediate shaft 126 when the wing outboard section 14 is in the folded position. The top surface 210 of the wing is relatively flat at this location. Furthermore, the flap sections 20, 22 are completely external to the flap drive rotary coupling 120 and the internal torque tubes. Thus, the top surface 210 can be provided with a pivotal cover 220 which conceals the aperture 200 when the wing is unfolded and which retracts to expose the aperture when the outboard wing section is folded.

In view of the above, it will be appreciated with other variations and modifications of the invention are contemplated. For example, telescoping structure of the input and output shafts of the slat drive embodiment and the intermediate shaft of the flap drive embodiment may be other than those shown in the drawings. Furthermore, the type and construction of the universal joints described may be modified to accommodate different operating conditions. Therefore, the scope of the invention is not to be limited by the above description, but is to be determined in scope by the claims which follow.

I claim:

1. An articulated rotary coupling for transmitting torque across a wing fold axis on a folding wing aircraft, wherein each wing is of the type which has an inboard section pivotally connected to an outboard section so as to be pivotable about the wing fold axis greater than 90°, wherein each wing also has coordinated, moveable airflow control surfaces on each section, driven by a torque transmitting member which defines a drive axis substantially transverse to and displaced from the wing fold axis, comprising:

three shafts, each having first and second ends, including an input shaft connected for rotation with the torque transmitting member, an intermediate shaft moveable between wing folded and wing unfolded positions, and an output shaft, at least one of the shafts having means for varying the length thereof;

four rotating universal joints, the first two joints connected so as to form a first rotary connection having an input coupled for rotation with the input shaft and an output coupled for rotation with the first end of the intermediate shaft, the second two joints connected so as to form a second rotary connection having an input coupled for rotation with the second end of the intermediate shaft and an output coupled for rotation with the output shaft; and position defining means for positively defining a travel path for the intermediate shaft between the wing folded and unfolded positions whereby torque can be smoothly transmitted from the input to the output shafts during wing folding and unfolding operations.

2. The coupling of claim 1 wherein both the input and output shafts have means for varying the lengths thereof and the intermediate shaft has a fixed length.

3. The coupling of claim 2 wherein the position defining means includes a first carriage rotatably connected and axially fixed to the input shaft, a second carriage rotatably connected and axially fixed to the first rotary connection and between the first two rotating joints, a third carriage rotatably connected and axially fixed to the second rotary connection and between the second two rotating joints, and a fourth carriage rotatably connected and axially fixed to the output shaft, the position defining means further including guide means for guiding the carriages with respect to the wing sections so that the intermediate shaft does not intersect the wing fold axis when the wing is moved to in the folded position.

4. The coupling of claim 3 wherein the guide means includes an inboard track section having inboard means for slidably receiving the first and second carriages and outboard means for slideably receiving the third and fourth carriages.

5. The coupling of claim 4 wherein the inboard and outboard track sections each have first portions defining planes substantially aligned with the respective wing sections and second portions defining acute angles with respect to the first portions wherein the input, intermediate and output shafts are co-linear with the drive axis when the wing is unfolded.

6. The coupling of claim 1 wherein the input and output shafts have fixed lengths and wherein the intermediate shaft has the means for varying the length thereof so that the intermediate shaft intersects the wing fold axis when the wing is in the folded position.

7. The coupling of claim 6 wherein the position defining means includes an inboard non-torque transmitting position limiting mechanism pivotable about two intersecting orthogonal axes, rotatably connected and axially fixed to the input shaft and rotatably connected to the first end of the intermediate shaft, and an outboard non-torque transmitting position limiting mechanism pivotable about two intersecting orthogonal axes, rotatably connected and axially fixed to the output shaft and rotatably connected to the second end of the intermediate shaft.

8. The coupling of claim 7 wherein the inboard and outboard non-torque transmitting mechanisms each have a first yoke having two arms, a second yoke having two arms pivotally connected to the two arms of the first yoke so as to define a first one of the orthogonal axes, and a third yoke having a single arm pivotally connected to the second yoke so as to define a second one of the orthogonal axes, wherein the third yokes of each mechanism are rotatably connected to the intermediate shaft and wherein the first yokes of the inboard and outboard mechanisms are rotatably connected and axially fixed to the input and output shafts, respectively.

9. The coupling of claim 8 wherein the pivotal connections of the first, second and third yokes are positioned so that angular displacement between the intermediate shaft and the input and output shafts is distributed substantially equally among the four rotating joints.

10. The coupling of claim 6 wherein the inboard and outboard wing sections define apertures to accommodate the intermediate shaft when the wing is folded and include a pivotally attached cover to conceal the aperture when the wing is unfolded.

11. An articulated rotary coupling for transmitting torque across a wing fold axis on a folding wing aircraft, comprising:
- a wing having an inboard wing section pivotally connected to an outboard wing section so as to be pivotable about the wing fold axis greater than 90°, the wing also having coordinated, moveable airflow control surfaces on each section, driven by a torque transmitting member which defines a drive axis substantially transverse to and displaced from the wing fold axis;
- three shafts, each having first and second ends, including an input shaft rotatably connected to the inboard wing section and connected for rotation with the torque transmitting member, an intermediate shaft moveable between wing folded and wing unfolded positions, and an output shaft rotatably connected to the outboard wing section, at least one of the shafts having means for varying the length thereof;
- a first rotary connection having an input coupled for rotation with the input shaft and an output coupled for rotation with the first end of the intermediate shaft, and a second rotary connection having an input coupled for rotation with the second end of the intermediate shaft and an output coupled for rotation with the output shaft wherein the first and second rotary connections each include two interconnected universal joints; and
- position defining means for positively defining a travel path for the intermediate shaft between the wing folded and unfolded positions whereby torque can be smoothly transmitted from the input to the output shafts during wing folding and unfolding operations.

12. The coupling of claim 11 wherein the wing fold axis is offset from the drive axis by more than 90°.

13. The coupling of claim 11 wherein both the input and output shafts have means for varying the lengths thereof and the intermediate shaft has a fixed length.

14. The coupling of claim 11 wherein the input and output shafts have fixed lengths and wherein the intermediate shaft has the means for varying the length thereof so that the intermediate shaft intersects the wing fold axis when the wing is in the folded position.

15. An articulated rotary coupling for transmitting torque across a wing fold axis on a folding wing aircraft, wherein each wing is of the type which has an inboard section pivotally connected to an outboard section so as to be pivotable about the wing fold axis greater than 90°, wherein each wing also has coordinated, moveable airflow control surfaces on each section, driven by a torque transmitting member which defines a drive axis substantially transverse to and displaced from the wing fold axis, comprising:
- three shafts, each having first and second ends, including an input shaft connected for rotation with the torque transmitting member, an intermediate shaft moveable between wing folded and wing unfolded positions, and an output shaft, at least one of the shafts having means for varying the length thereof;
- four rotating joints, the first two joints connected so as to form a first rotary connection having an input coupled for rotation with the input shaft and an output coupled for rotation with the first end of the intermediate shaft, the second two joints connected so as to form a second rotary connection having an input coupled for rotation with the second end of the intermediate shaft and an output coupled for rotation with the output shaft; and
- substantially identical inboard and outboard position defining means for positively defining a travel path for the intermediate shaft between the wing folded and unfolded positions whereby torque can be smoothly transmitted from the input to the output shafts during wing folding and unfolding operations on folding wing aircraft wherein the drive axis is substantially displaced from the wing fold axis.

16. The coupling of claim 15 wherein both the input and output shafts have means for varying the lengths thereof and the intermediate shaft has a fixed length.

17. The coupling of claim 16 wherein the position defining means includes a first carriage rotatably connected and axially fixed to the input shaft, a second carriage rotatably connected and axially fixed to the first rotary connection and between the first two rotating joints, a third carriage rotatably connected and axially fixed to the second rotary connection and between the second two rotating joints, and a fourth carriage rotatably connected and axially fixed to the output shaft, the position defining means further including guide means for guiding the carriages with respect to the wing sections so that the intermediate shaft does not intersect the wing fold axis when the wing is moved to in the folded position.

18. The coupling of claim 15 wherein the input and output shafts have fixed lengths and wherein the intermediate shaft has the means for varying the length thereof so that the intermediate shaft intersects the wing fold axis when the wing is in the folded position.

19. The coupling of claim 18 wherein the position defining means includes an inboard non-torque transmitting position limiting mechanism pivotable about two intersecting orthogonal axes, rotatably connected and axially fixed to the input shaft and rotatably connected to the first end of the intermediate shaft, and an outboard non-torque transmitting position limiting mechanism pivotable about two intersecting orthogonal axes, rotatably connected and axially fixed to the output shaft and rotatably connected to the second end of the intermediate shaft.

20. The coupling of claim 19 wherein the inboard and outboard non-torque transmitting mechanisms each have a first yoke having two arms, a second yoke having two arms pivotally connected to the two arms of the first yoke so as to define a first one of the orthogonal axes, and a third yoke having a single arm pivotally connected to the second yoke so as to define a second one of the orthogonal axes, wherein the third yokes of each mechanism are rotatably connected to the intermediate shaft and wherein the first yokes of the inboard and outboard mechanisms are rotatably connected and axially fixed to the input and output shafts, respectively.

* * * * *